(12) United States Patent
Terryn et al.

(10) Patent No.: US 10,694,671 B2
(45) Date of Patent: Jun. 30, 2020

(54) HEADER WITH MULTIPLE ROW ELEMENTS

(71) Applicant: CNH Industrial America LLC, New Holland, PA (US)

(72) Inventors: Mathieu M. A. Terryn, Kortemark (BE); Stijn Borry, Pittem (BE); Yvan C. C. Vandergucht, Lo-Reninge (BE); Maarten Ysebaert, Tielt (BE)

(73) Assignee: CNH Industrial America LLC, New Holland, PA (US)

( * ) Notice: Subject to any disclaimer, the term of this patent is extended or adjusted under 35 U.S.C. 154(b) by 123 days.

(21) Appl. No.: 15/956,971

(22) Filed: Apr. 19, 2018

(65) Prior Publication Data

US 2019/0320582 A1    Oct. 24, 2019

(51) Int. Cl.
*A01D 41/127* (2006.01)
*A01D 45/02* (2006.01)
*A01D 69/08* (2006.01)
*A01D 61/00* (2006.01)

(52) U.S. Cl.
CPC ....... *A01D 41/1274* (2013.01); *A01D 45/023* (2013.01); *A01D 45/025* (2013.01); *A01D 69/08* (2013.01); *A01D 61/006* (2013.01)

(58) Field of Classification Search
CPC .. A01D 41/1274; A01D 69/08; A01D 45/025; A01D 45/023; A01D 61/006; A01D 45/021; A01D 75/182; A01D 34/76
See application file for complete search history.

(56) References Cited

U.S. PATENT DOCUMENTS

| 4,089,396 | A | * | 5/1978 | Quick | A01D 69/08 192/54.52 |
| 4,282,702 | A | | 8/1981 | McBee | |
| 4,458,471 | A | * | 7/1984 | Herwig | A01D 41/1274 460/6 |
| 4,487,002 | A | * | 12/1984 | Kruse | A01D 41/1274 460/6 |

(Continued)

FOREIGN PATENT DOCUMENTS

| DE | 19815571 A1 | 10/1999 |
| EP | 1402768 A1 | 3/2004 |

(Continued)

*Primary Examiner* — Arpad Fabian-Kovacs
(74) *Attorney, Agent, or Firm* — Peter Zacharias; Patrick Sheldrake

(57) ABSTRACT

An agricultural vehicle with a header including multiple row units each include a feed/snapping unit and a chopping unit. The header further includes a first power transmission shaft for driving the feed/snapping units, and a second power transmission shaft connected via a drivetrain to a drive at the agricultural vehicle. Each chopper unit includes a safety clutch and is connected via the safety clutch to the second power transmission shaft. At least one torque sensor is provided for the second power transmission shaft, drivetrain, or drive, which torque sensor is operationally connected to a torque fluctuation monitor configured to recognize a predetermined change in torque fluctuation indicating a safety clutch slip. The torque fluctuation monitor is operationally connected to a user interface for signaling the safety clutch slip.

11 Claims, 5 Drawing Sheets

(56) References Cited

U.S. PATENT DOCUMENTS

| | | | | |
|---|---|---|---|---|
| 5,921,070 A * | 7/1999 | Chamberlain | A01D 45/021 56/10.2 G |
| 5,927,054 A * | 7/1999 | Chamberlain | A01D 45/021 56/10.2 E |
| 6,370,853 B1 * | 4/2002 | Randall | A01D 45/021 56/14.2 |
| 6,843,044 B2 * | 1/2005 | Clauss | A01D 41/127 56/10.3 |
| 7,047,717 B1 * | 5/2006 | Wolters | A01D 45/021 56/60 |
| 7,062,897 B2 * | 6/2006 | Rickert | A01D 45/021 56/103 |
| 7,874,134 B1 * | 1/2011 | Hoffman | A01D 45/023 56/119 |
| 7,937,918 B1 * | 5/2011 | Mossman | A01D 43/08 56/11.7 |
| 9,295,196 B2 * | 3/2016 | Surmann | A01D 45/021 |
| 9,578,804 B2 * | 2/2017 | Gessel | A01D 43/08 |
| 10,412,888 B2 * | 9/2019 | Matway | A01D 43/085 |
| 2001/0003237 A1 * | 6/2001 | Wolters | A01D 45/021 56/64 |
| 2005/0279073 A1 * | 12/2005 | Clauss | A01D 41/142 56/364 |
| 2007/0289281 A1 * | 12/2007 | Altepost | A01D 43/082 56/64 |
| 2009/0192734 A1 * | 7/2009 | Mackin | A01D 75/182 702/56 |
| 2011/0203243 A1 * | 8/2011 | Finkler | A01D 41/127 56/10.8 |
| 2012/0042618 A1 * | 2/2012 | Lohrentz | A01D 45/021 56/60 |
| 2012/0055131 A1 * | 3/2012 | Zegota | A01D 45/021 56/60 |
| 2012/0055133 A1 * | 3/2012 | Lohrentz | A01D 45/021 56/94 |
| 2014/0020354 A1 * | 1/2014 | Tilly | A01D 45/021 56/103 |
| 2014/0020355 A1 * | 1/2014 | Tilly | A01D 45/021 56/103 |
| 2014/0202127 A1 * | 7/2014 | Tilly | A01D 45/02 56/10.3 |
| 2015/0257337 A1 * | 9/2015 | Schrattenecker | A01D 45/025 56/60 |
| 2016/0007526 A1 * | 1/2016 | Greulich | F16H 7/08 56/10.2 R |
| 2017/0049051 A1 * | 2/2017 | Cleodolphi | A01D 41/1274 |
| 2018/0160621 A1 * | 6/2018 | Hammar | A01D 34/76 |
| 2018/0199508 A1 * | 7/2018 | Mueller | A01D 41/141 |
| 2019/0053427 A1 * | 2/2019 | Matway | A01D 41/1271 |
| 2019/0055993 A1 * | 2/2019 | Pautz | A01D 75/182 |
| 2019/0183048 A1 * | 6/2019 | Flintoft | A01D 41/1274 |
| 2019/0289787 A1 * | 9/2019 | Heitmann | A01D 43/085 |

FOREIGN PATENT DOCUMENTS

| | | |
|---|---|---|
| EP | 1747709 A1 | 1/2007 |
| EP | 2084953 A2 | 8/2009 |
| EP | 2687079 A2 | 1/2014 |

* cited by examiner

HEADER WITH MULTIPLE ROW ELEMENTS

FIELD OF THE INVENTION

The present invention relates to an agricultural harvester comprising a header with multiple row elements extending along the width of the header.

BACKGROUND OF THE INVENTION

Agricultural vehicles known as combine harvester are historically termed such because it combines multiple harvesting functions within a single harvesting unit, including picking, threshing, separating and cleaning. A combine therefore carries a header at a front end which is adapted to cut crop material from a field. The agricultural vehicle carries the header via a feeder, which is adapted to transport the crop material, removed from the field by the header, towards the body of the vehicle. In the body of the vehicle, typically, the threshing rotors are provided to perform threshing operations on the crop. Further cleaning systems are included in the body of the vehicle so that crop and residue can be optimally separated.

The present invention particularly relates to an agricultural harvester carrying a header having multiple row elements along the width of the header. Such headers are known in the art for example as corn headers or sunflower headers. Each row element comprises a feed/snapping unit. The feed/snapping unit typically includes a pair of stripper plates spaced apart from each other and extending in a forward driving direction of the agricultural vehicle carrying the header. The feed/snapping unit further comprises a pair of stalk rolls positioned underneath the stripper plates, and a pair of gathering chains for moving the stalks into the space between the stripper plates. The feed/snapping unit pulls the stem downward through the pair of stripper plates. Thereby the distance between the stripper plates is chosen such that the heads of the crop material, for example the corn heads or sunflower heads, are too large to pass through the stripper plates so that they are removed from the stalk.

Each row element further comprises a chopping unit. When the stalks are pulled downward through the stripper plates, the chopping unit chop the stalks into pieces. Thereby, it will be clear that other residue elements such as leaves are also chopped into pieces together with the stalks. These pieces are then distributed onto the field.

US 2015/0305240 describes an agricultural vehicle having a header with such set-up. In this document, it is described to separately drive the feed/snapping unit and the chopping units. By separately driving these units, the operating speed of the feed/snapping unit can be independently controlled from the operating speed of the chopping unit. Particularly the chopping units are known to consume a lot of energy. Therefore, being able to reduce the chopping unit operating speed in predetermined situations would allow a significant reduction of energy consumption.

A drawback of separately driving the feed/snapping units and the chopping units relates to the safety clutch that is typically provided between a drivetrain and the chopper units. The safety clutch is placed between each chopper unit and the drive shaft, and is adapted to slip when a threshold load is crossed by the chopper. From the agricultural vehicle cabin, operation of the feed/snapping unit can be visually controlled. In other words, an operator can see whether the feed/snapping unit is correctly operating. However, since the chopper units are located underneath the feed/snapping units, they cannot be seen from the agricultural vehicle's cabin. When the feed/snapping units are physically linked to the chopper units, a safety clutch slip can be directly visually detected by the operator since such safety clutch slip would stop both the feed/snapping unit and the chopping unit. However, when the drive system for the feed/snapping unit is separated from the drive system for the chopping unit, a safety clutch slip at the chopping unit cannot be visually detected by the operator. As a result, an operator will continue driving with a slipping safety clutch, thereby permanently damaging the safety clutch mechanism. Replacing a damaged safety clutch is cumbersome and time consuming and therefore highly costly.

It is an object of the present invention to provide a mechanism that allows early detection of clutch activation.

SUMMARY OF THE INVENTION

To this end, the invention provides in an agricultural vehicle with a header comprising multiple row units along a width of the header, each of wherein the multiple row units comprising a feed/snapping unit and a chopping unit, wherein the header comprises a first power transmission shaft extending along the multiple row units for driving the feed/snapping units of the multiple row units, the header comprising a second power transmission shaft connected via a drivetrain to a drive at the agricultural vehicle, wherein each chopper unit comprises a safety clutch and is connected via the safety clutch to the second power transmission shaft, wherein at least one torque sensor is provided at one of the second power transmission shaft, drivetrain and drive, which torque sensor is operationally connected to a torque fluctuation monitor adapted to recognize a predetermined change in torque fluctuation indicating a safety clutch slip, the torque fluctuation monitor being operationally connected to a user interface for signaling the safety clutch slip.

The invention is based on the insight that a safety clutch slip changes the torque fluctuation. Therefore, by monitoring the torque fluctuation the safety clutch slip can be detected when a change in torque fluctuation is recognized. This can be communicated to a user via a user interface. Thereby, situations can be prevented where a safety clutch is activated without the operator noticing it, thereby permanently damaging the safety clutch. In the agricultural vehicle of the invention, safety clutch slip is signaled via a user interface, so that an operator of the vehicle can promptly react to the slip. The invention has a further advantage that it does not require a sensor at each single safety clutch. Placing such sensor at each safety clutch would have as a result that appropriate wiring is to be provided throughout the header, which wiring is easy to be damaged in the rough working conditions where such headers are typically operated. In the invention, a single torque measurement is sufficient to detect that a safety clutch slips. For an operator, and for preventing damage to the slipping safety clutch, it is irrelevant to know which of the multiple safety clutches is slipping. Tests have shown that via the torque sensor at one of the power transmission shaft drivetrain and drive, it can be measured in a reliable manner that at least one safety clutch slips. Furthermore, the technical elements that are required to detect such slip are easy to install. The mechanism of the invention informs an operator of a safety clutch slip such that damage can be prevented.

Preferably, the torque sensor comprises at least one load sensor. A load sensor is typically applied to an outer surface of a shaft. A load sensor can for example be formed by a strain gauge. Further preferably, the torque sensor is attached to at least one of the power transmission shafts and the drivetrain. This is based on the insight that the load on the shaft and/or drivetrain is directly proportional to the torque transmitted through the shaft and/or drivetrain. Since the load is directly proportional to the torque, the torque can be measured via a load sensor. This makes a load sensor a type of torque sensor.

Preferably, the torque fluctuation monitor is adapted to measure a torque fluctuation amplitude in at least one frequency range, and wherein the torque fluctuation monitor recognizes the change by detecting an amplitude deviation over time in said at least one frequency range. The at least one frequency range can be determined based on knowledge and/or experience as the at least one frequency range wherein an amplitude changes when a clutch slips.

Preferably, an amplitude threshold is set for at least one frequency range, and wherein the torque fluctuation monitor recognizes the change when the amplitude in the range crosses the threshold. Tests and measurements have shown that one or multiple frequency ranges can be selected in which the amplitude crosses a predetermined threshold when a safety clutch slips. Using electronic signal processing means, crossing of a threshold within a predetermined range can be fairly easy determined.

Preferably, the power transmission shaft is connected via a further drivetrain to a second drive at the agricultural vehicle. The power transmission shaft drives the feed/snapping unit. By connecting them to a separate drive at the agricultural vehicle, the operating speed of the feed/snapping unit can be chosen independently from the operating speed of the chopper units.

The invention further relates to a method for detecting slip of the safety clutch between a chopper and a row unit of a header of an agricultural vehicle, the method comprising:

driving the chopper via the safety clutch by a power transmission shaft connected via drivetrain to a drive of the agricultural vehicle;

measuring a torque in at least one of the power transmission shaft, drivetrain and drive;

detecting a predetermined change in torque fluctuation indicating a safety clutch slip; and signaling the detected safety clutch slip via a user interface.

The method of the invention comprises the steps that mainly correspond to the use of the above described agricultural vehicle. Therefore, many of the effects and advantages that are described above in relation to the agricultural vehicle are equally applicable to the method of the invention. Using the method of the invention, slip of a safety clutch can be detected and signaled to an operator via a user interface. This allows, in the header design, to separate the feed/snapping unit drive elements from the chopper unit drive elements without operational drawbacks. As a result of this separation, the header can be operated more energy efficiently, as described above. However, due to the separation a safety clutch slip cannot be visually detected by an operator from the agricultural vehicle's cabin. Via the method of the invention, the operator is informed at an early stage of a safety clutch slip. This gives the operator the opportunity to react in a proper manner to avoid permanent damage to the safety clutch.

Preferably, the torque is measured by measuring a load via at least one load sensor attached to at least one of the power transmission shaft and the drivetrain. The load on the power transmission shaft or the drivetrain is directly proportional to the torque that is transmitted through the power transmission shaft and the drivetrain. Therefore, a load measurement can provide information relating to the torque.

Preferably, the torque is measured by measuring a torque fluctuation amplitude in at least one frequency range. Further preferably, detecting a predetermined change in torque fluctuation comprises recognizing a predetermined deviation in torque fluctuation amplitude in the at least one frequency range. Further, preferably, recognizing a predetermined deviation comprises detecting crossing of a predetermined amplitude threshold. As described above, at least one frequency range can be determined wherein the amplitude of torque fluctuation increases above a predetermined threshold when a safety clutch slips. Simple signal processing means can be used to detect such crossing of a predetermined amplitude threshold within a predetermined frequency range.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

Figure 1:
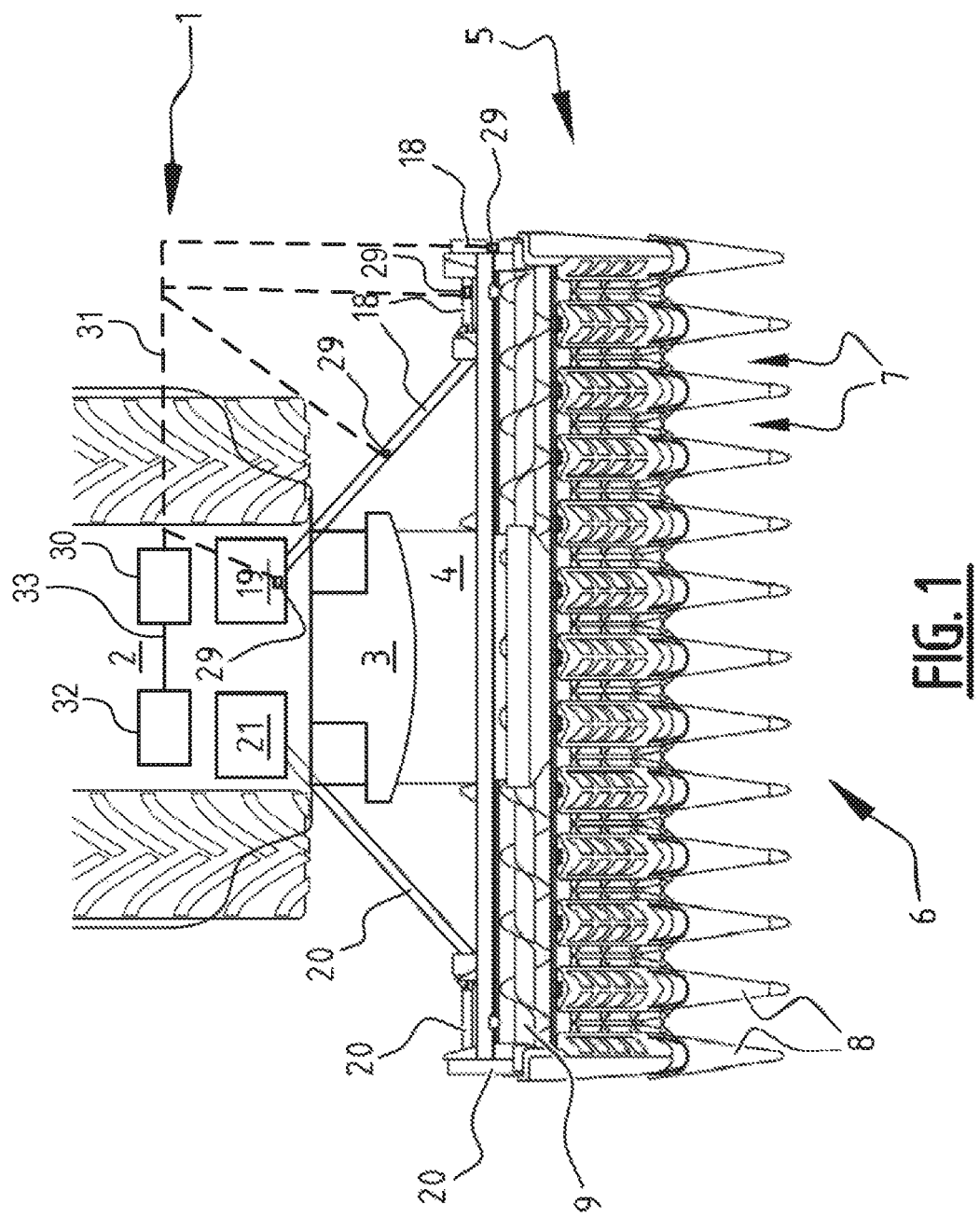
FIG. 1 shows a top view of an agricultural vehicle carrying a header.

FIG. 1 shows a top view of a front part of an agricultural vehicle 1. The figure shows part of the body 2 of the vehicle 1. The body 2 of the agricultural vehicle 1 comprises threshing and/or crop processing mechanisms which are known in the art and which are therefore not further described in this description. At a front end of the body 2, an operator's cabin 3 is provided. Via the operator's cabin 3, an operator can see the ground surface in front of the vehicle 1, for steering the agricultural vehicle 1 in the right direction. From the operator's cabin 3 the operator can further visually control and monitor the operation of the header 5. Header 5 is connected, at a front end of the agricultural vehicle 1, to a feeder 4. The feeder extends between the header 5 and the body 2 of the agricultural vehicle 1 to transport crop material from the header 5 to the body 2.

The header 5 comprises multiple row units 6 positioned along a front end of the header 5. Individual row units are referred to in FIG. 1 with reference number 7. Between adjacent row units 7, hoods 8 are provided. The hoods 8 extend forward from the header 5 and are suitable for guiding crop on a field towards an entrance of the row units 7. At a back end of the multiple row units 6, an auger 9 is provided for laterally transporting crop material towards a central part of the header 5, where the header 5 opens towards the feeder 4 so that the crop material is transportable by the header 5 towards the body 2 of the vehicle.

Figure 2:
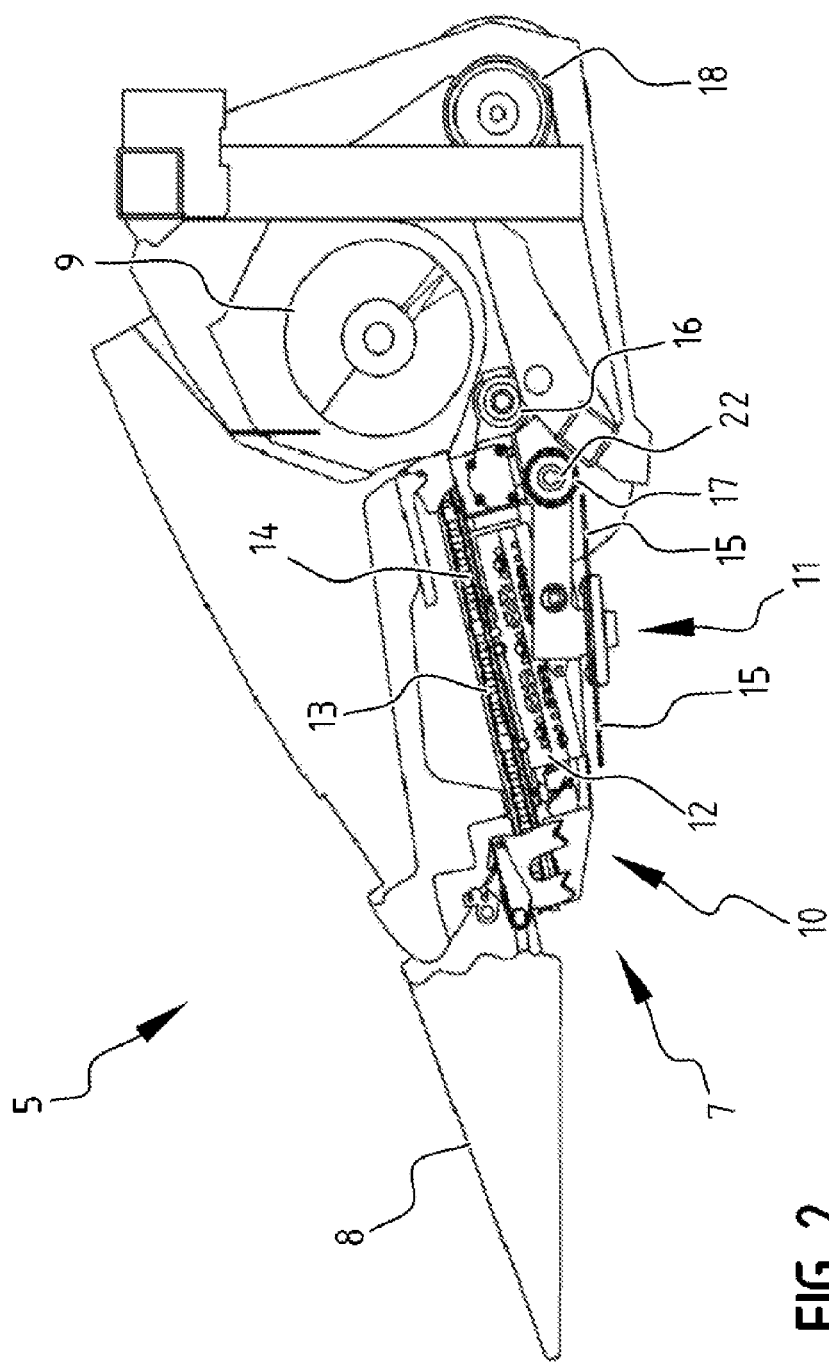
FIG. 2 shows a cross-sectional view of the header.

The components of a row unit 7 are described with reference to FIG. 2. FIG. 2 shows a cross-section of the header 5. Thereby, FIG. 2 shows at a front end of the header 5 the hood 8. Adjacent to the hood 8, the row units are arranged. Each row unit 7 comprises a feed/snapping unit 10 forming an upper part of the row unit 7, and a chopping unit 11 forming a lower part of the row unit 7. The feed/snapping unit 10 comprises three main elements being a pair of stalk rolls 12, a pair of gathering chains 13 and a pair of stripper plates 14. In operation, when the header 5 is moved over a field, the feed/snapping unit processes crop stalks by catching the crop stalks at a front end of the feed/snapping unit 10 via the pair of gathering chains 13. The pair of gathering chains 13 prevents the stalks from drifting or moving out of the row unit 7. The stalk is then further caught between the pair of stalk rolls, while the stalk rolls rotate such that the stalk is pulled downward through pair of stalk rolls. Above the stalk rolls, a pair of stripper plates 14 is provided at a distance from each other such that the stalk and leaves of the crop can pass through the pair of stripper plates, while the heads of the crop material, for example the cobs of the corn, are prevented from passing through the stripper plates. This allows the feed/snapping unit to separate the stems and residue from the heads of the crop material. Such feed/snapping unit, and the principles of operation thereof are known and therefore not described in further detail.

The moving elements 12, 13, 14 of the feed/snapping unit 10 are preferably connected to a first power transmission shaft 16 extending along the width of the header 5. Each feed/snapping unit 10 of the multiple row units 6 connects to this first power transmission shaft 16 to be driven by this shaft 16. As a result, the operating speeds of all feed/snapping units 10 of the multiple row units 6 are the same.

The chopping unit 11 comprises one or more chopping knives 15. The chopping knives 15 are provided to extend at least partially, preferably directly below at least a part of the pair of stalk rolls 12. The chopping knives 15 are provided to cut the stems into small pieces when the stems are pulled downward between the pair of stalk rolls. Obviously, other elements such as leaves are also cut into smaller pieces by the chopping knives 15. The chopper units 11 of the multiple row units 6 are connected to a second power transmission shaft 17 extending along the width of the header 5. The second power transmission shaft 17 is separate from the first power transmission shaft 16. The second power transmission shaft 17 is driven independently from the first power transmission shaft 16. Via the second power transmission shaft, chopping units 11 are driven at the same operating speeds. The operating speed of the chopper units is controllable independent from the operating speed of the feed/snapping units, since they are connected to different power transmission shafts 17, 16. As described above, such separation allows significant operational improvements.

For safety purposes, each chopping unit 11 is connected to the second power transmission shaft 17 via a safety clutch 22. The safety clutch 22 is for example provided at the second power transmission shaft 17. This means that replacing such a clutch 22 would require the complete second power transmission shaft 17, extending along the substantially complete width of the header 5, to be demounted. Therefore, a protection mechanism, described hereunder, is provided so that a safety clutch slip can be detected at an early stage by the operator of the vehicle.

From the operator's cabin, only the upper part of the header 5 is visually controllable. The chopper unit operation cannot be seen from the operator's cabin, since they are located at a lower side of the header 5. Therefore, a safety clutch slip and the direct effects thereof cannot be seen by the operator from the operator's cabin 3. A safety clutch slip could only be detected without additional signaling mechanisms, when uncut stems arrive at the back end of the vehicle. When this happens, the clutch 22 has already been slipping for a while, so that the clutch 22 is likely to be permanently damaged and may needs replacement.

With reference to FIG. 1, the driving mechanisms for driving the first power transmission shaft 16 and the second power transmission shaft 17 are further described. The second power transmission shaft 17 is connected via a drive train 18 to a drive 19 at the agricultural vehicle 1. The first power transmission shaft 16 is connected via a further drive train 20 to a second drive at the agricultural vehicle 1. The drive trains 18 and 20 extend between a respective drive at the agricultural vehicle and a lateral side of the header 5, where it is connected to the power transmission shaft. In FIG. 1, an example is shown where the second power transmission shaft 17 is connected to the drive train 18 at the right hand side of the header 5, while the further drive train 20 is connected to the first power transmission shaft 16 at the left hand side of the header 5. It will be clear to a skilled person that this can be arranged the other way around, or that multiple drive trains can be connected to the corresponding power transmission shafts from the same side of the header 5. Each drive train 18, 20 preferably comprises one or multiple shafts, connectors, gearboxes, chains, gears and other elements to transmit a rotation from the drive 19, 21 at the agricultural vehicle to the power transmission shaft 17, 16 at the header 5.

The invention is based on the insight that slip of a safety clutch 22 connected to the second power transmission shaft 17 has an effect on the torque fluctuation. The torque is transmitted from the drive 19 at the agricultural vehicle, via the drive train 18 to the second power transmission shaft 17. The second power transmission shaft 17 is connected via the multiple safety clutches 22 to the multiple chopping units 11 of the multiple row units 6. In this regard, tests have shown that the change in torque fluctuation as the result of one of the safety clutches 22 slipping can be felt throughout the substantially complete driving mechanism. This relieves the manufacturer from the need of placing a slip detection sensor at each of the safety clutches 22 and provides the possibility to mount one or several "central" sensors in the driving mechanism to detect the change in torque fluctuation.

FIG. 1 illustrates how a torque sensor 29 is provided at the drive 19 and at multiple positions of the drive train 18. It will be clear from the skilled person that the possibilities for mounting such torque sensor are not limited to the illustrated positions. Furthermore, it will be also clear the one or multiple of the shown sensors can be selected, and it is not required to have all shown sensors. Alternatively, additional sensors 29 can be added. The torque sensor can be embodied as a load sensor, as is described above, since the load is directly proportional to the torque. The skilled person will understand that torque can be measured in multiple ways, and can select a suitable way depending on the situation to arrive at the claimed invention. A torque fluctuation monitor 30 receives the signals from the torque sensors 29 via signal lines 31, shown as dashed lines. The torque fluctuation monitor 30 connects to a user interface 32 via connecting line 33.

Figure 3:
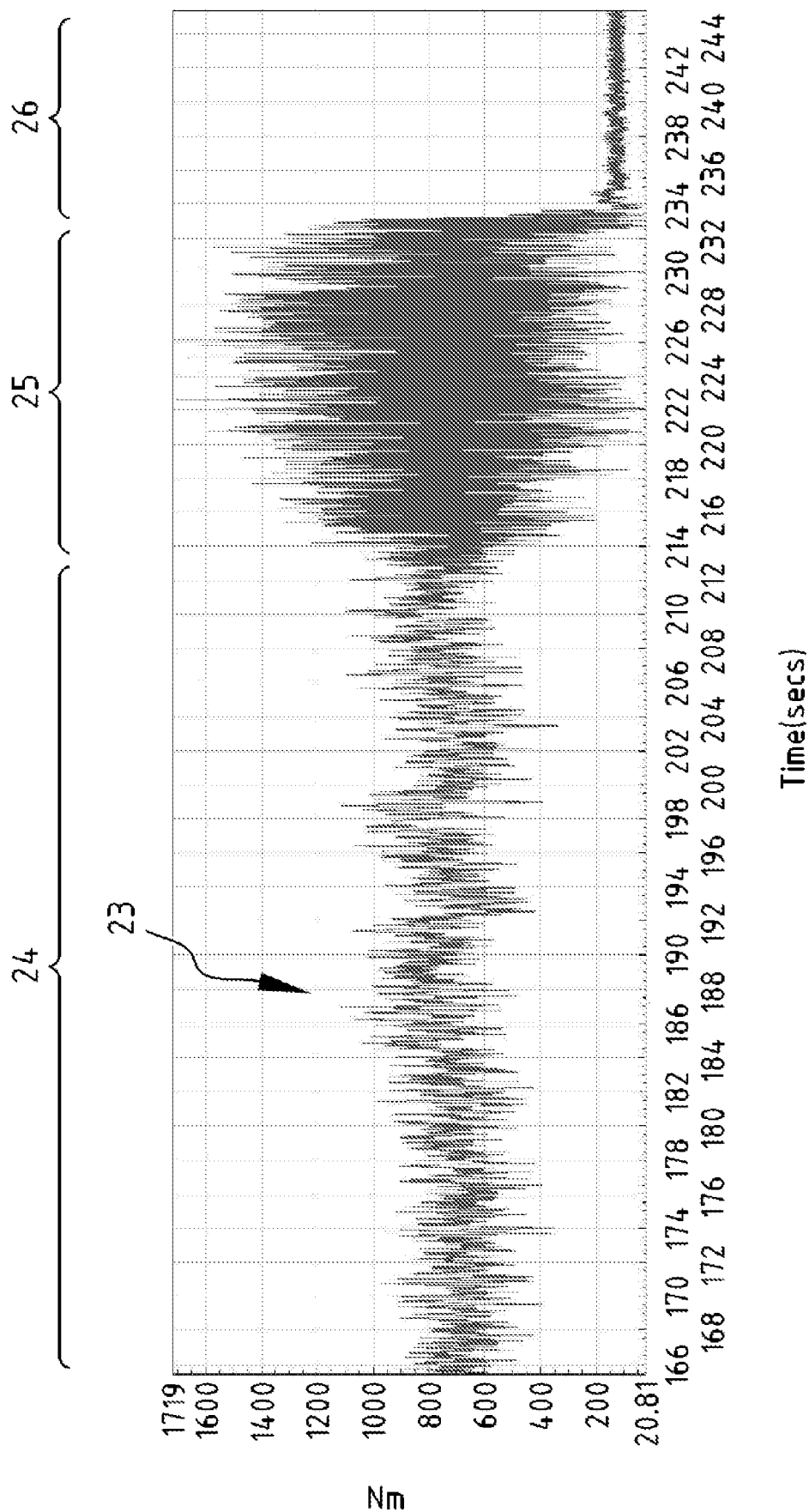
FIG. 3 shows the torque fluctuation in the time domain.

FIG. 3 illustrates a torque fluctuation 23 over time. Thereby, the horizontal axis shows the time while the vertical axis shows the torque. In the first segment of FIG. 3, the header operates under normal conditions. This first segment is indicated with reference number 24. A torque fluctuation is shown during this normal operation 24, and is shown in the frequency domain in FIG. 4 with line 27. FIG. 3 shows a second segment 25 showing the torque fluctuation when one of the clutches 22 slip. Already, from FIG. 3 the difference between the torque fluctuation between normal operation 24 and during a safety clutch slip 25 is significant.

Figure 4:
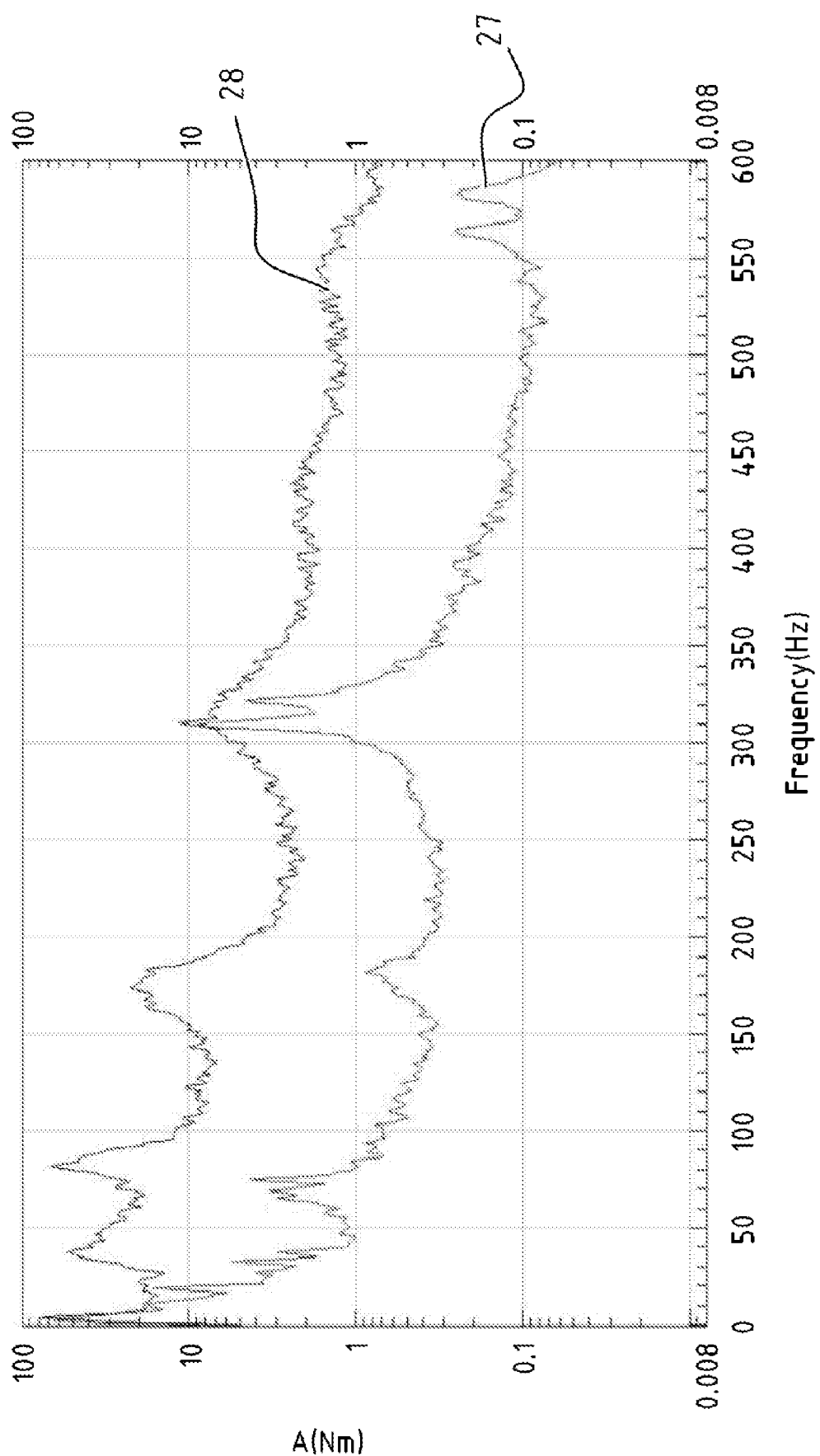
FIG. 4 shows the torque fluctuation in the frequency domain.

FIG. 4 shows the safety clutch slip fluctuation with reference number 28. It shows that for many frequency ranges, the amplitude of fluctuation is significantly higher compared to a normal operation 27. For completeness, FIG. 3 further shows a segment 26 corresponding to a stopped operation. Based on these FIGS. 3 and 4, the skilled person will directly understand and be able to design electric, electronic and/or digital tools to detect the safety clutch slip from the torque measurement.

Figure 5:
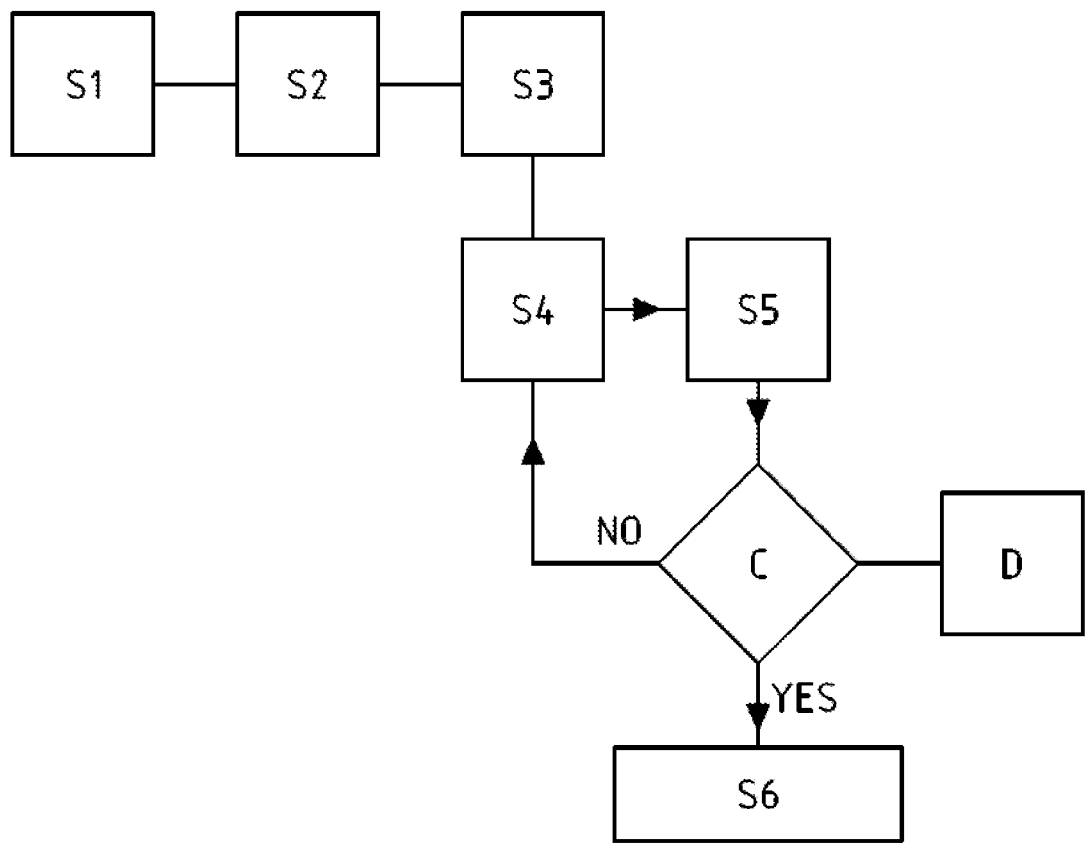
FIG. 5 illustrates the steps of an embodiment of the method of the invention.

FIG. 5 illustrates the steps of the method for detecting and signaling a safety clutch slip. Step S1 illustrates driving the agricultural vehicle. When the agricultural vehicle is driven in step 1, the feed/snapping units can be driven indicated with step S2. Thereby, step S2 comprises driving the second drive 21 so that via the further drive train the first power transmission shaft 16 is driven to drive the feed/snapping unit elements. In step S3, the chopping units are driven. Driving the chopping units S3 therefore comprises the steps of starting the drive 19, so that via the drive train 18 the second power transmission shaft 17 are started. This second power transmission shaft 17 is connected via respective safety clutches 22 to the chopping units 11, so that the chopping units are driven.

The feed/snapping units, which are driven in step S2 can be visually controlled from the operator's cabin. The chopping units, driven in step S3, are not visible for an operator in the operator's cabin. Therefore, the method further comprises measuring a torque fluctuation, step S4. The torque fluctuation can be measured via the torque or load sensors 29. The torque/load sensors measure a torque fluctuation, as is shown in FIG. 3.

In step S5, the torque fluctuation is analyzed. Analyzing the torque fluctuation S5 could comprise periodically, for example every second, converting the torque fluctuation from the time domain to the frequency domain as is shown in FIG. 4. The skilled person will understand that other torque fluctuation analyses can be made, for example to filter a predetermined characteristic from the fluctuation signal. In step C, the torque fluctuation is compare to recognize a change in torque fluctuation. In the example of FIG. 5, the comparison is made between the torque fluctuation signal analyzed in step S5, and a predetermined change reference data D. This predetermined change reference data could comprise a threshold amplitude for a given frequency range. Other more complex reference mechanisms can be used to detect a change in the fluctuation.

When the comparing step does not recognize a change (NO) the torque fluctuation measurement is continued as in step S4. In this regard, it is noted that steps S4, S5 and the comparing step C can be implemented in a continuous manner or in a periodic manner. If the comparing step shows a difference (YES) the method goes to step S6 where a safety clutch slip is signaled via a user interface. The user interface is preferably available to the operator, for example integrated into the operator's cabin, so that a safety clutch slip signaling S6 directly informs the operator that a safety clutch is slipping. The operator can react to the signaling based on this knowledge and experience to prevent damage to the slipping clutch.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

What is claimed is:

1. An agricultural vehicle comprising:
   a header comprising:
      multiple row units along a width of the header, each of the multiple row units comprising a feed/snapping unit and a chopping unit comprising a safety clutch;
      a first power transmission shaft extending along the multiple row units for driving the feed/snapping units of the multiple row units;
      a second power transmission shaft connected via a drivetrain to a drive at the agricultural vehicle, wherein the chopping unit of each of the multiple row units is connected via the safety clutch of the each of the multiple row units to the second power transmission shaft;
      at least one torque sensor provided at one of the second power transmission shaft, the drivetrain, and the drive;
      a torque fluctuation monitor operationally connected to said at least one torque sensor and configured to recognize a predetermined change in torque fluctuation indicating a safety clutch slip of the safety clutch of at least one of the multiple row units; and
      a user interface operationally connected to said torque fluctuation monitor for signaling the safety clutch slip.

2. The agricultural vehicle according to claim 1, wherein the torque sensor comprises at least one load sensor.

3. The agricultural vehicle according to claim 2, wherein the at least one load sensor is attached to at least one of the second power transmission shaft and the drivetrain.

4. The agricultural vehicle according to claim 1, wherein the torque fluctuation monitor is adapted to measure a torque fluctuation amplitude in at least one frequency range, and wherein the torque fluctuation monitor is adapted to recognize the change by detecting an amplitude deviation over time in the at least one frequency range.

5. The agricultural vehicle according to claim 4, wherein an amplitude threshold is set for at least one frequency range, and wherein the torque fluctuation monitor is adapted to recognize the change when the amplitude in the at least one frequency range crosses the threshold.

6. The agricultural vehicle according to claim 1, wherein the first power transmission shaft is connected via a further drivetrain to a second drive at the agricultural vehicle.

7. A method for detecting a slip of a safety clutch between a chopper of a row unit of a header of an agricultural vehicle, the method comprising steps of:
   driving the chopper via the safety clutch by a power transmission shaft connected via a drivetrain to a drive;
   measuring a torque in at least one of the power transmission shaft, the drivetrain, and the drive;
   detecting a predetermined change in torque fluctuation indicating the slip of the safety clutch; and
   signaling the detected slip of the safety clutch via a user interface.

8. The method according to claim 7, wherein the torque is measured by measuring a load via at least one load sensor attached to at least one of the power transmission shaft and the drivetrain.

9. The method according to claim 7, wherein the torque is measured by measuring a torque fluctuation amplitude in at least one frequency range.

10. The method according to claim 7, wherein the detecting a predetermined change in torque fluctuation comprises recognizing a predetermined deviation in torque fluctuation amplitude in at least one frequency range.

11. The method according to claim 10, wherein the recognizing the predetermined deviation comprises detecting crossing of a predetermined amplitude threshold.

\* \* \* \* \*